(12) United States Patent
Horiuchi et al.

(10) Patent No.: US 11,150,636 B2
(45) Date of Patent: Oct. 19, 2021

(54) STATE DETERMINATION DEVICE AND STATE DETERMINATION METHOD

(71) Applicant: FANUC Corporation, Yamanashi (JP)

(72) Inventors: Atsushi Horiuchi, Yamanashi (JP); Hiroyasu Asaoka, Yamanashi (JP); Kenjirou Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/554,624

(22) Filed: Aug. 29, 2019

(65) Prior Publication Data
US 2020/0089202 A1 Mar. 19, 2020

(30) Foreign Application Priority Data
Sep. 19, 2018 (JP) .............................. JP2018-174987

(51) Int. Cl.
*G05B 19/418* (2006.01)
*B29C 45/76* (2006.01)
*G05B 13/02* (2006.01)

(52) U.S. Cl.
CPC ...... *G05B 19/41875* (2013.01); *B29C 45/768* (2013.01); *G05B 13/0265* (2013.01); *B29C 2945/76163* (2013.01); *G05B 2219/33034* (2013.01); *G05B 2219/34465* (2013.01)

(58) Field of Classification Search
CPC .......... G05B 19/41875; G05B 13/0265; G05B 2219/34465; G05B 2219/33034; G05B 2219/31356; G05B 19/4184; G05B 2219/45244; B29C 45/768; B29C 2945/76163; B29C 45/76; B29C 2945/76949; Y02P 90/02
USPC ........................................................ 700/110
See application file for complete search history.

(56) References Cited

U.S. PATENT DOCUMENTS

| 5,153,149 A | 10/1992 | Naito et al. |
| 2004/0139810 A1* | 7/2004 | Saito ...................... B29C 45/768 73/865.9 |
| 2004/0148136 A1* | 7/2004 | Sasaki ................ G05B 19/4065 702/188 |
| 2006/0068049 A1* | 3/2006 | Nishizawa .............. B29C 45/76 425/145 |

(Continued)

FOREIGN PATENT DOCUMENTS

| JP | 56394810 A | 4/1988 |
| JP | H1-168421 A | 7/1989 |

(Continued)

*Primary Examiner* — Kenneth M Lo
*Assistant Examiner* — Mohammed Shafayet
(74) *Attorney, Agent, or Firm* — Hauptman Ham, LLP

(57) ABSTRACT

A state determination device acquires data related to an injection molding machine, stores a learning model obtained by learning an operation state of the injection molding machine with respect to the data, and performs estimation using the learning model based on the data. Further, the state determination device acquires a correction coefficient, which is associated with a type of the injection molding machine and equipment attached to the injection molding machine and numerically converts and corrects the estimation result with a predetermined correction function to which the acquired correction coefficient is applied.

7 Claims, 5 Drawing Sheets

(56) References Cited

U.S. PATENT DOCUMENTS

| | | | |
|---|---|---|---|
| 2008/0099943 A1* | 5/2008 | Yamagiwa | B29C 45/76 264/40.5 |
| 2009/0045537 A1* | 2/2009 | Cheng | B29C 45/77 264/40.3 |
| 2014/0370139 A1 | 12/2014 | Horiuchi | |
| 2015/0099026 A1* | 4/2015 | Shiraishi | B29C 45/84 425/170 |
| 2016/0170384 A1* | 6/2016 | Charest-Finn | G05B 13/048 700/44 |
| 2017/0028593 A1* | 2/2017 | Maruyama | B29C 45/768 |
| 2017/0326771 A1 | 11/2017 | Uchiyama | |

FOREIGN PATENT DOCUMENTS

| | | |
|---|---|---|
| JP | 201382181 A | 5/2013 |
| JP | 2015482 A | 1/2015 |
| JP | 2017-30221 A | 2/2017 |
| JP | 2017154497 A | 9/2017 |
| JP | 2017-202632 A | 11/2017 |

\* cited by examiner

FIG.4

CORRECTION COEFFICIENT a

SCREW DIAMETER

| | | 20 | 25 | 30 | 35 | 40 |
|---|---|---|---|---|---|---|
| TYPE OF MACHINE | 15t | 1 | 2 | 2 | 3 | 4 |
| | 30t | 1 | 2 | 2 | 3 | 4 |
| | 50t | 1 | 2 | 2 | 4 | 4 |
| | 100t | 1 | 2 | 3 | 4 | 5 |
| | 150t | 1 | 2 | 3 | 4 | 5 |
| | 300t | 1 | 3 | 3 | 4 | 6 |
| | 450t | 1 | 3 | 3 | 5 | 6 |

FIG.5

CORRECTION COEFFICIENT b

SCREW DIAMETER

| | | 20 | 25 | 30 | 35 | 40 |
|---|---|---|---|---|---|---|
| TYPE OF MACHINE | 15t | 0 | 0 | 1 | 1 | 3 |
| | 30t | 0 | 1 | 1 | 1 | 3 |
| | 50t | 0 | 1 | 1 | 1 | 5 |
| | 100t | 0 | 1 | 1 | 2 | 5 |
| | 150t | 0 | 1 | 1 | 2 | 5 |
| | 300t | 0 | 2 | 2 | 2 | 5 |
| | 450t | 0 | 2 | 2 | 2 | 5 |

STATE DETERMINATION DEVICE AND STATE DETERMINATION METHOD

RELATED APPLICATIONS

The present application claims priority to Japanese Patent Application Number 2018-174987 filed Sep. 19, 2018, the disclosure of which is hereby incorporated by reference herein in its entirety.

BACKGROUND OF THE INVENTION

1. Field of the Invention

The present invention relates to a state determination device and a state determination method and especially relates to a state determination device and a state determination method for assisting maintenance for injection molding machines.

2. Description of the Related Art

Industrial machines such as an injection molding machine are maintained regularly or when an abnormality occurs. In maintenance of an industrial machine, a maintenance staff determines whether an operation state of the industrial machine is normal or abnormal by using physical quantity, which represents operation states of the industrial machine that are preliminarily recorded in operation of the industrial machine, and thus performs maintenance work such as exchange of a part on which an abnormality occurs.

For example, as maintenance work for a check ring of an injection cylinder included in an injection molding machine, a method is known in which a screw is regularly taken out from the injection cylinder to directly measure the dimension of the check ring. However, production has to be temporarily stopped to perform the measurement operation in this method, thus disadvantageously lowering productivity.

Further, there are wide variety of types of injection molding machines, such as an injection apparatus including an injection cylinder, a mold clamping apparatus, and a molded article ejection apparatus, which have mutually-different specifications. Therefore, it is necessary to prepare as many state determination devices and criteria for determining presence of abnormality as the types of injection molding machines.

As prior art techniques for solving such a problem, techniques are known in which a rotation torque applied on a screw is detected and a back-flow phenomenon in which resin flows toward the back of the screw is detected so as to indirectly detect a wear amount of a check ring of an injection cylinder and diagnose an abnormality without temporarily stopping production such as taking out a screw from the injection cylinder. For example, Japanese Patent Application Laid-Open No. 01-168421 discloses a technique in which a rotation torque acting on a screw rotation direction is measured and abnormality is determined when the rotation torque is not in an allowable range. Further, Japanese Patent Application Laid-Open No. 2017-030221 and Japanese Patent Application Laid-Open No. 2017-202632 disclose techniques for diagnosing abnormality through supervised learning on a load on a driving unit, a resin pressure, and the like.

However, the above-described technique disclosed in Japanese Patent Application Laid-Open No. 01-168421 has a problem in that an operation for adjusting allowable ranges used for determining abnormality is required for machines having different specification data such as a rated torque and inertia of a motor constituting a driving unit of an injection molding machine and a reduction ratio of a reduction gear.

Further, the above-described techniques disclosed in Japanese Patent Application. Laid-Open No. 2017-030221 and Japanese Patent Application. Laid-Open No. 2017-202632 have a problem in that divergence between measured values obtained from machines having different specifications of components constituting driving units of injection molding machines and numerical values of learning data inputted in machine learning is too large to perform correct determination with machine learning. Especially there is a problem in that one learning model obtained through machine learning cannot be generally used in wide variety of injection molding machines.

Further, there is a problem in that if a kind of resin, which is a raw material of a molded article to be manufactured by an injection molding machine, and kinds of auxiliary equipment of the injection molding machine such as a die, a mold temperature adjusting machine, and a resin dryer are different from those in machine learning, divergence is generated between measured values obtained from the machine and measured values used in creating learning model due to the influence of the kind difference and accordingly determination as to whether an abnormality is present or not by mean of machine learning cannot be correctly performed.

It is known that various types of learning conditions are prepared as many as combinations of pieces of equipment, such as a motor, a reduction gear, and a movable unit, constituting an injection molding machine and machine learning is performed when learning models of the machine learning are produced, so as to improve determination accuracy of the machine learning. However, performing machine learning with various types of injection molding machines, auxiliary equipment, and components requires a large cost. In addition to this, raw materials such as resin and workpieces need to be prepared when machines are operated, requiring large cost for raw materials used for acquiring learning data. Further, operations for acquiring learning data require much time. Thus, there is a problem in that learning data cannot be efficiently collected.

SUMMARY OF THE INVENTION

An object of the present invention is to provide a state determination device and a state determination method by which maintenance of various injection molding machines can be assisted without requiring a large amount of cost.

According to the present invention, the above-described problems are solved by deriving an abnormality degree correction value which is obtained by performing numeric conversion such as adding a predetermined correction amount with respect to an abnormality degree estimation value of a driving unit of an injection molding machine. The abnormality degree estimation value is derived by performing machine learning of time-series physical quantity (current and speed, for example) acquired as learning data from a controller, for an abnormality degree estimated through machine learning.

More specifically an abnormality degree correction value is derived by numerically converting an abnormality degree estimation value so as to absorb difference among types of machines and pieces of auxiliary equipment even when types of injection molding machines are mutually different and even when pieces of auxiliary equipment of injection molding machines and kinds of resin which is a production material are mutually different, specifically even when sizes of machines are different as a small size or a large size and even when components of injection molding machines such as injection apparatuses, mold clamping apparatuses, injection cylinders, screws, and motors are mutually different, realizing a means for determining presence of abnormality by generally and efficiently applying one learning model to various types of injection molding machines.

Further, based on an abnormality degree obtained as an output of machine learning, means are provided for displaying a message or an icon expressing a state of an abnormality on a display device, for stopping an operation of a movable unit of a machine so as to secure safety of an operator when an abnormality degree is equal to or larger than a predetermined value, for slowing down a motor driving the movable unit so as to allow the movable unit to operate safely and for limiting a driving torque of the motor small.

A state determination device according to an aspect of the present invention determines an operation state of an injection molding machine, and, includes: a data acquisition unit that acquires data related to an injection molding machine; a learning model storage unit that stores a learning model obtained by learning an operation state of an injection molding machine with respect to data related to the injection molding machine; an estimation unit that performs estimation using the learning model stored in the learning model storage unit, based on data acquired by the data acquisition unit; a correction coefficient storage unit that stores a correction coefficient which is associated with at least either one of a type of an injection molding machine and equipment attached to the injection molding machine; and a numeric conversion unit that acquires a correction coefficient which is stored in the correction coefficient storage unit, based on at least either one of a type of an injection molding machine, whose data is acquired by the data acquisition unit, and equipment attached to the injection molding machine and numerically converts and corrects an estimation result obtained by the estimation unit, using a predetermined correction function, to which the acquired correction coefficient is applied.

The learning model may be learned with at least one learning method among supervised learning, unsupervised learning, and reinforcement learning.

The correction function may be at least one of a polynomial function and a rational function.

The data acquisition unit may acquire data related to each of a plurality of injection molding machines which are mutually connected via a wired/wireless network, from the plurality of injection molding machines.

A state determination method according to another aspect of the present invention is a method for determining an operation state of an injection molding machine and includes: a data acquisition step for acquiring data related to an injection molding machine; an estimation step for performing estimation using a learning model, which is obtained by learning an operation state of an injection molding machine with respect to data related to the injection molding machine, based on data acquired in the data acquisition step; and a numeric conversion step for numerically converting and correcting an estimation result, which is obtained in the estimation step, using a predetermined correction function to which a correction coefficient is applied and which is associated with at least either one of a type of an injection molding machine, whose data is acquired in the data acquisition step, and equipment attached to the injection molding machine.

According to the present invention, an abnormality degree representing a state of an injection molding machine outputted in estimation is converted depending on a type of an injection molding machine, which is a determination object, and equipment attached to the injection molding machine and abnormality determination for the injection molding machine is performed based on the result obtained by the conversion without collecting learning data of various types of machines and performing learning. Accordingly various states of injection molding machines can be estimated without requiring large cost in learning.

BRIEF DESCRIPTION OF THE DRAWINGS

FIG. 4 illustrates an example of a correction coefficient stored in a correction coefficient storage unit.

FIG. 5 illustrates another example of a correction coefficient stored in the correction coefficient storage unit.

DETAILED DESCRIPTION OF THE PREFERRED EMBODIMENT

Figure 1:
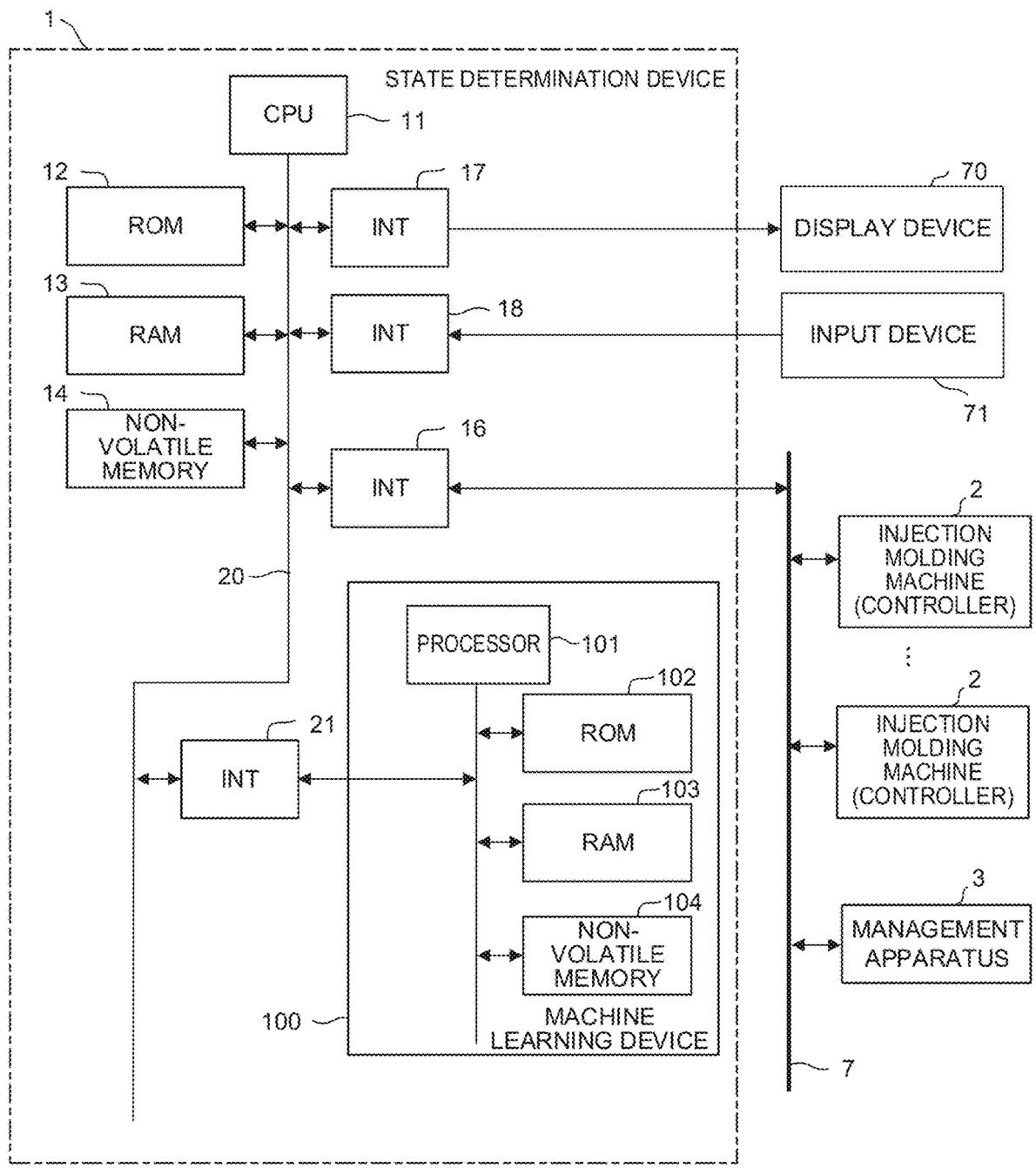
FIG. 1 is a schematic hardware configuration diagram illustrating a state determination device according to an embodiment.

FIG. 1 is a schematic hardware configuration diagram illustrating chief parts of a state determination device including a machine learning device according to an embodiment.

A state determination device 1 according to the present embodiment can be mounted on a controller that controls an injection molding machine, for example. Further, the state determination device 1 can also be mounted as a personal computer which is installed with a controller that controls an injection molding machine, a management apparatus 3 which is connected with the controller via a wired/wireless network, or a computer such as an edge computer, a cell computer, a host computer, and a cloud server. The present embodiment provides a description of an example in which the state determination device 1 is mounted as a personal computer which is installed with a controller that controls an injection molding machine.

A CPU 11 included in the state determination device 1 according to the present embodiment is a processor for entirely controlling the state determination device 1. The CPU 11 reads out a system program stored in a ROM 12 via a bus 20 and controls the whole of the state determination device 1 in accordance with the system program. In a RAM 13, transient calculation data, various types of data which are inputted by an operator via an input device 71, and the like are temporarily stored.

A non-volatile memory 14 is composed of a memory a solid state drive (SSD), or the like which is backed up by a battery (not illustrated), for example, and thus a storage state thereof is maintained even when the state determination device 1 is turned off. The non-volatile memory 14 stores a setting region in which setting information related to an operation of the state determination device 1 is stored; data inputted from the input device 71, various types of data acquired from an injection molding machine 2 (a type of machine, the mass and a material of a die; and a kind of resin, for example), time-series data of various types of physical quantity (a temperature of a nozzle; a position, a speed, an acceleration, current, a voltage, and a torque of a power engine that drives the nozzle; a temperature of a die; and a flow rate, a flow velocity; and pressure of resin, for example) detected in a molding operation by the injection molding machine 2, data read via an external storage device (not illustrated) and a network, and the like. Programs and various types of data stored in the non-volatile memory 14 may be loaded into the RAM 13 when the programs and the data are executed or used.

In the ROM 12, a known analysis program for analyzing various types of data; and a system program including, for example, a program for controlling communication with a machine learning device 100 which will be described later are preliminarily written.

The state determination device 1 is connected with a wired/wireless network 7 via an interface 16. At least one injection molding machine 2, the management apparatus 3 that manages a manufacturing operation performed by the injection molding machine 2, and the like are connected to the network 7 and perform data exchange with the state determination device 1.

The injection molding machine 2 is a machine for manufacturing a product molded with resin such as plastic, and melts resin, which is a material, and fills a die with the melted resin (injects the melted resin into the die) so as to mold the resin. The injection molding machine 2 is composed of various pieces of equipment such as a nozzle, a power engine (a motor, for example), a transmission mechanism, reduction gears, and a movable unit and a state of each of the components is detected by a sensor or the like and an operation of each of the components is controlled by a controller. Examples of the power engine used in the injection molding machine 2 include an electric motor, a hydraulic cylinder, a hydraulic motor, and an air motor. Further, examples of the transmission mechanism used in the injection molding machine 2 include a ball screw gears, pulleys, and belts.

Each piece of data read on a memory data obtained as results of execution of programs or the like, data outputted from the machine learning device 100 which will be described later, and the like are outputted via an interface 17 to be displayed on a display device 70, Further, the input device 71 composed of a keyboard, a pointing device, or the like transfers a command, data, and the like based on an operation by an operator to the CPU 11 via an interface 18.

An interface 21 is an interface for connecting the state determination device 1 with the machine learning device 100. The machine learning device 100 includes a processor 101 for controlling the whole of the machine learning device 100, a ROM 102 which stores a system program and the like, a RAM 103 for performing temporary storage in each processing related to machine learning, and a non-volatile memory 104 used for storing learning models and the like. The machine learning device 100 is capable of observing each piece of information (various types of data such as a type of the injection molding machine 2, the mass and a material of a die, and a kind of resin; and time-series data of various types of physical quantity (such as a temperature of a nozzle; a position, a speed, an acceleration, current, a voltage, and a torque of a power engine that drives the nozzle; a temperature of a die; and a flow rate, a flow velocity; and pressure of resin), for example) which can be acquired by the state determination device 1, via the interface 21. Further, the state determination device 1 acquires processing results outputted from the machine learning device 100 via the interface 21 and stores and displays the acquired results, and transmits the acquired results to other devices via a network, which is not illustrated, or the like.

Figure 2:
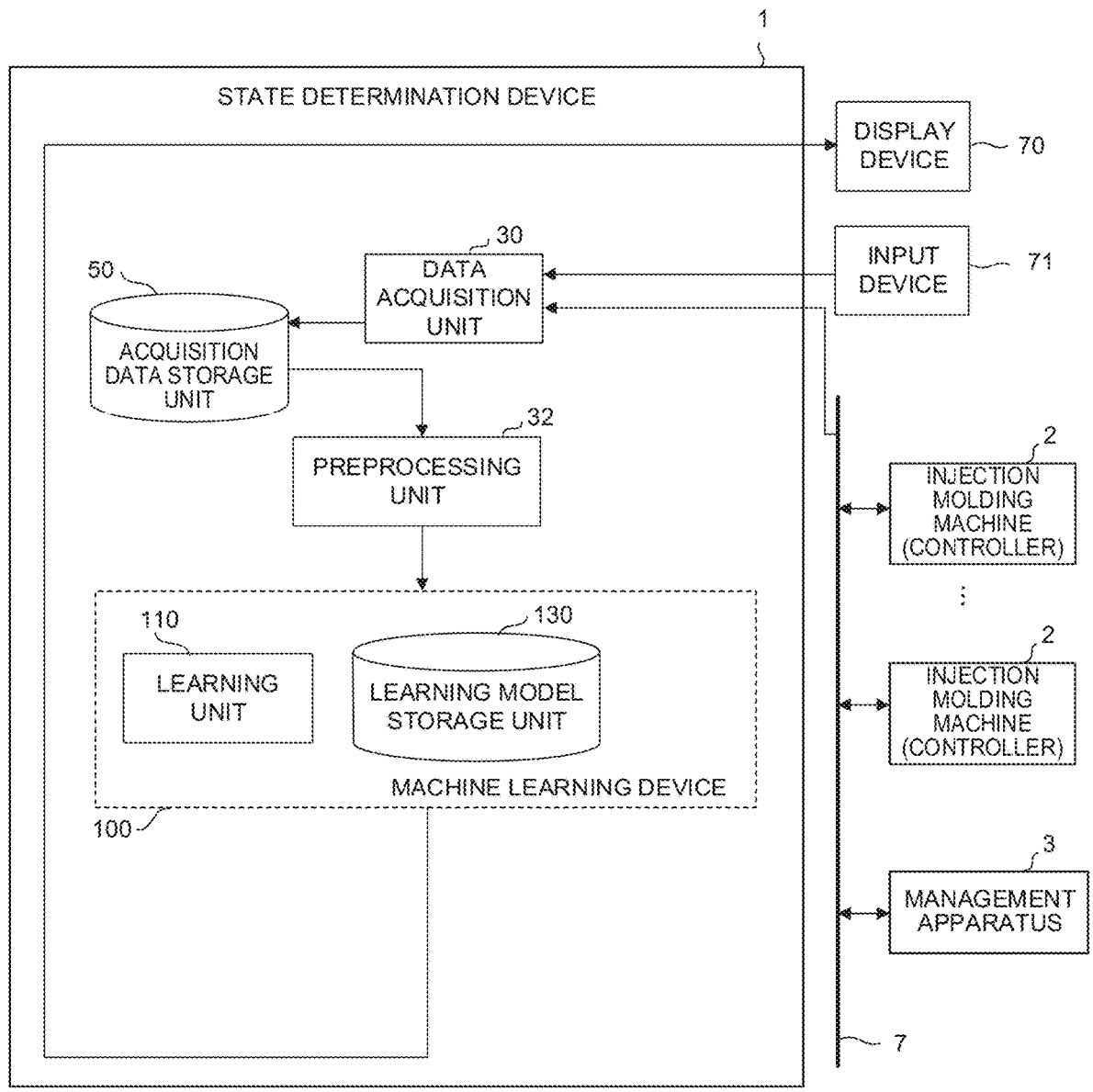
FIG. 2 is a schematic functional block diagram illustrating the state determination device during learning.

FIG. 2 is a schematic functional block diagram illustrating the state determination device 1 and the machine learning device 100 during learning.

The state determination device 1 illustrated in FIG. 2 includes components required for learning performed by the machine learning device 100 (learning mode). Functional blocks illustrated in FIG. 2 are realized when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 illustrated in FIG. 2 includes a data acquisition unit 30 and a preprocessing unit 32, and the machine learning device 100 included in the state determination device 1 includes a learning unit 110. Further, an acquisition data storage unit 50 which stores data acquired from external machines and the like is provided on the non-volatile memory 14. A learning model storage unit 130 which stores learning models constructed through machine learning performed by the learning unit 110 is provided on the non-volatile memory 104 of the machine learning device 100.

The data acquisition unit 30 acquires various types of data inputted from the injection molding machine 2, the input device 71, and the like. The data acquisition unit 30 acquires various types of data such as a type of the injection molding machine 2, the mass and a material of a die, and a kind of resin; time-series data of various types of physical quantity (such as a temperature of a nozzle; a position, a speed, an acceleration, current, a voltage, and a torque of a power engine that drives the nozzle; a temperature of a die; and a flow rate, a flow velocity; and pressure of resin); and various types of data such as information related to a maintenance work for the injection molding machine 2 inputted by an operator, for example, and stores these pieces of data in the acquisition data storage unit 50, In acquisition of time-series data, the data acquisition unit 30 sets time-series data acquired in a predetermined temporal range (a range of one step, for example) as one time-series data based on an output of signal data acquired from the injection molding machine 2 and change in other time-series data and stores the time-series data in the acquisition data storage unit 50. The data acquisition unit 30 may acquire data from other computers via an external storage device, which is not illustrated, or the wired/wireless network 7.

The preprocessing unit 32 creates data to be used for learning performed by the machine learning device 100, based on acquisition data stored in the acquisition data storage unit 50. The preprocessing unit 32 creates data obtained by converting (quantifying, sampling, for example) acquisition data stored in the acquisition data storage unit 50 into data having a unified format to be used in the machine learning device 100. When the machine learning device 100 performs unsupervised learning, the preprocessing unit 32 creates state data S having a predetermined format for the unsupervised learning; when the machine learning device 100 performs supervised learning, the preprocessing unit 32 creates a set of state data S and label data L having a predetermined format for the supervised learning; and when the machine learning device 100 performs reinforcement learning, the preprocessing unit 32 creates a set of state data S and determination data D having a predetermined format for the reinforcement learning.

The learning unit 110 performs machine learning using data which is created by the preprocessing unit 32. The learning unit 110 generates learning models by performing machine learning using data acquired from the injection molding machine 2, with a known machine learning method such as unsupervised learning, supervised learning, and reinforcement learning and stores the generated learning models in the learning model storage unit 130. Examples of the unsupervised learning performed by the learning unit 110 include the autoencoder method and the k-means method. Examples of the supervised learning include the multilayer perceptron method, the recurrent neural network method, the long short-term memory method, and the convolutional neural network method, Examples of the reinforcement learning include the Q learning.

The learning unit 110 performs unsupervised learning based on data which is obtained by converting acquisition data, which is acquired from the injection molding machine 2 in a normal operation state and is stored in the acquisition data storage unit 50, by the preprocessing unit 32 and thus, the learning unit 110 is capable of generating distribution of data acquired in a normal state as a learning model, for example. With the learning model thus generated, an estimation unit 120 which will be described later is capable of estimating how much data which is obtained by converting acquisition data, which is acquired from the injection molding machine 2, by the preprocessing unit 32 deviates from data acquired in a normal operation state and thus calculating an abnormality degree as an estimation result.

Further, the learning unit 110 performs supervised learning using data which is obtained by imparting a normal label to acquisition data acquired from the injection molding machine 2 which is in a normal operation state and imparting an abnormal label to acquisition data acquired from the injection molding machine 2 before and after an abnormality has occurred (and converting the acquisition data by the preprocessing unit 32), being able to generate a discrimination boundary between normal data and abnormal data as a learning model, for example. With the learning model thus generated, the estimation unit 120 which will be described later can estimate whether the data which is obtained by converting acquisition data, which is acquired from the injection molding machine 2, by the preprocessing unit 32 belongs to normal data or abnormal data and calculate a label value (normal/abnormal) as an estimation result and reliability of the label value.

In the state determination device 1 having the above-described configuration, the learning unit 110 performs learning by using data acquired from the injection molding machine 2. Data used for learning by the learning unit 110 may be data acquired from one injection molding machine, for example, and data acquired from a plurality of injection molding machines including mutually-different equipment do not have to be especially used. A learning model created by the learning unit 110 is used for estimation of a state of an injection molding machine performed by the estimation unit 120 which will be described later. However, not limited to estimation for an injection molding machine which has been used for learning, the learning model may be used for estimation for a state of another injection molding machine performed based on data acquired from the other injection molding machine, with numeric conversion of estimation results performed by a numeric conversion unit 34 which will be described later.

Figure 3:
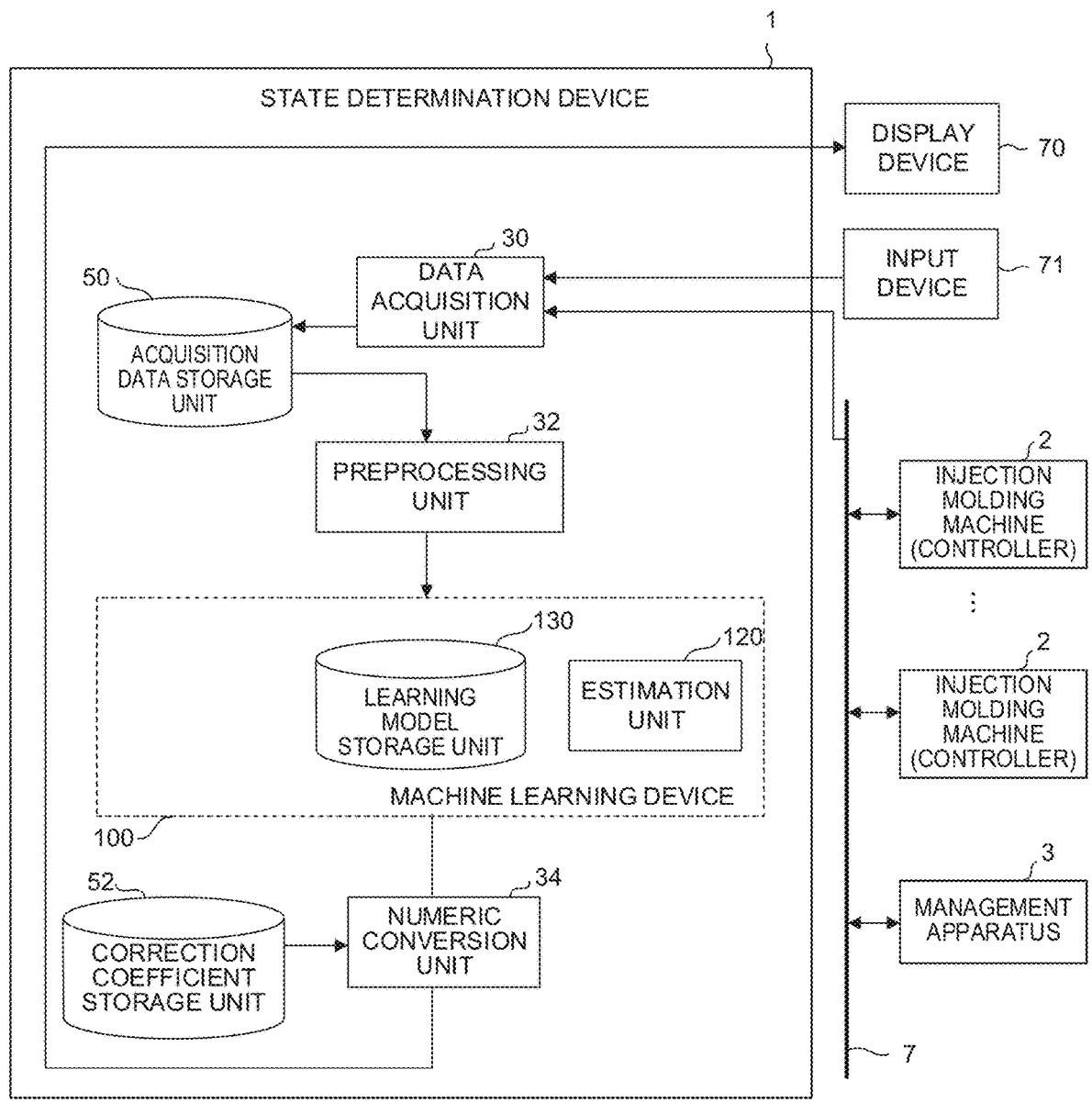
FIG. 3 is a schematic functional block diagram illustrating the state determination device according to an embodiment.

FIG. 3 is a schematic functional block diagram illustrating the state determination device 1 and the machine learning device 100 according to a first embodiment.

The state determination device 1 according to the present embodiment has the configuration required for estimation performed by the machine learning device 100 (estimation mode). Functional blocks illustrated in FIG. 3 are realized when the CPU 11 included in the state determination device 1 and the processor 101 of the machine learning device 100 which are illustrated in FIG. 1 execute respective system programs and respectively control an operation of each unit of the state determination device 1 and each unit of the machine learning device 100.

The state determination device 1 according to the present embodiment includes the data acquisition unit 30 and the preprocessing unit 32 as is the case with the state determination device 1 illustrated in FIG. 2 and further includes the numeric conversion unit 34, and the machine learning device 100 included in the state determination device 1 includes the estimation unit 120. Further, the acquisition data storage unit 50 which stores data used for state estimation performed by the machine learning device 100 and a correction coefficient storage unit 52 which stores correction amounts used for numeric conversion performed by the numeric conversion unit 34 are provided on the non-volatile memory 14, and the learning model storage unit 130 which stores learning models constructed through machine learning performed by the learning unit 110 is provided on the non-volatile memory 104 of the machine learning device 100.

The data acquisition unit 30 according to the present embodiment has similar functions of the data acquisition unit 30 illustrated in FIG. 2.

The preprocessing unit 32 according to the present embodiment creates state data S, which has a predetermined format and is to be used for estimation performed by the machine learning device 100, from acquisition data which is stored in the acquisition data storage unit 50. The preprocessing unit 32 creates state data obtained by converting (quantifying, sampling, for example) acquisition data stored in the acquisition data storage unit 50 into data having a uniformed format to be used in the machine learning device 100.

The estimation unit 120 estimates a state of an injection molding machine by using a learning model stored in the learning model storage unit 130 based on the state data S created by the preprocessing unit 32. The estimation unit 120 according to the present embodiment estimates and calculates an abnormality degree related to a state of the injection molding machine by inputting the state data S inputted from the preprocessing unit 32 into the learning model created (of which parameters are determined) by the learning unit 110, thereby estimating and calculating an abnormality degree related to a state of the injection molding machine.

The numeric conversion unit 34 numerically converts a result estimated by the estimation unit 120. The numeric conversion unit 34 may numerically convert a result, which is estimated by the estimation unit 120, by using a preset correction function, for example. In this case, correction coefficients of the correction function are preliminarily stored in the correction coefficient storage unit 52 such that the correction coefficients are associated with respective types of injection molding machines and respective pieces of equipment attached to the injection molding machines. Further, the numeric conversion unit 34 acquires correction coefficients associated with a type and equipment of the injection molding machine 2 which is a determination object from the correction coefficient storage unit 52 and numerically converts a result estimated by the estimation unit 120 with a correction function to which the acquired correction coefficients are applied.

Examples of a correction function set in the numeric conversion unit 34 include a polynomial function and a rational function. Formula (1) below is an example of a polynomial function used as a correction function. In Formula (1), x denotes an abnormality degree as a result estimated by the estimation unit 120, a and b denote correction coefficients, and y denotes an abnormality degree after correction.

$$y = ax + b \quad (1)$$

When the correction function exemplified in Formula (1) above is used, the correction coefficient a and the correction coefficient b are preliminarily stored in the correction coefficient storage unit 52 in a manner to be associated with types and equipment of injection molding machines as exemplified in FIG. 4 and FIG. 5, When the correction coefficients exemplified in FIGS. 4 and 5 are set, the numeric conversion unit 34 specifies and acquires the correction coefficients a and b based on a type of an injection molding machine 2 which is a state determination object and a screw diameter, and numerically converts an abnormality degree, which is estimated by the estimation unit 120, with Formula (1) to which the acquired correction coefficients are applied and outputs the converted abnormality degree. Here, correction coefficients stored in the correction coefficient storage unit 52 may be set in a manner to be associated only with a type of the injection molding machine 2, may be set in a manner to be associated only with equipment attached to the injection molding machine 2, or may be set in a manner to be associated with matters influencing on an operation of other injection molding machines 2.

Figure 6:
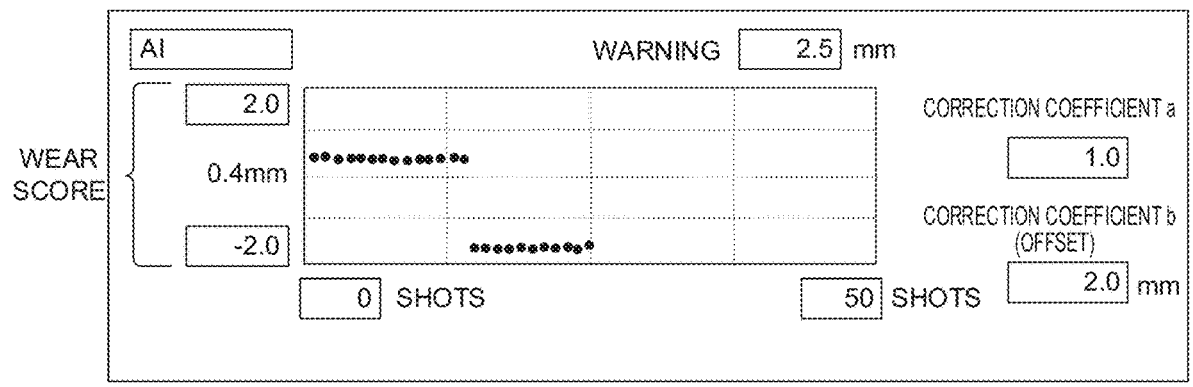
FIG. 6 illustrates an example of an interface for setting correction coefficients.

As for correction functions used by the numeric conversion unit 34 and correction coefficients stored in the correction coefficient storage unit 52, a plurality of types of injection molding machines are operated in a normal state and an abnormal state while exchanging equipment thereof and respective physical quantities are observed so as to plot respective abnormality degrees calculated based on the physical quantities, and each correction coefficient may be calculated based on a relation in abnormality degrees calculated in similar abnormal states when respective types of machines and respective pieces of equipment are used so that a similar abnormality degree is obtained with respect to a similar abnormal state even in any type of injection molding machines and in injection molding machines provided with any equipment. Further, in this case, the configuration may be employed in which correction coefficients stored in the correction coefficient storage unit 52 can be set via an interface used for setting correction coefficients and illustrated in FIG. 6, for example. Correction coefficients once obtained express a trend of abnormality degrees calculated with respect to respective combinations of an injection molding machine, equipment, and the like and can be used not only for a single learning model but also for various learning models.

Figure 7:
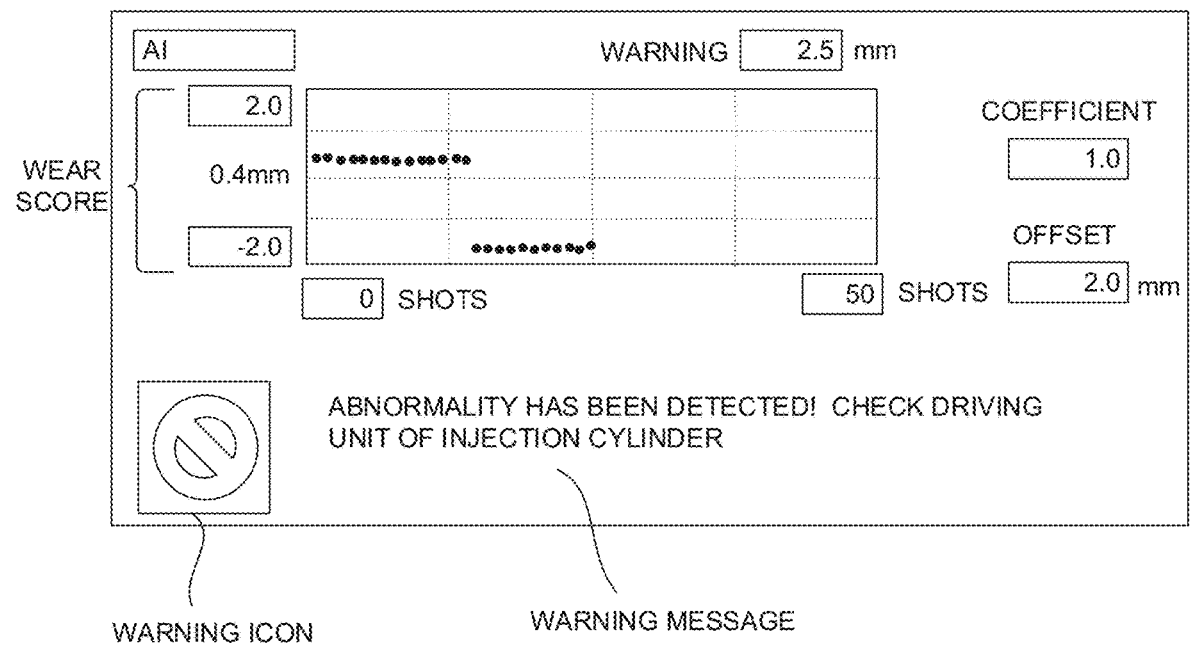
FIG. 7 illustrates a display example for an abnormal state.

Results obtained through estimation by the estimation unit 120 and numeric conversion by the numeric conversion unit 34 (abnormality degrees related to states of injection molding machines, for example) may be displayed and outputted to the display device 70 and may be transmitted and outputted to a host computer, a cloud computer, and the like, via a wired/wireless network, which is not illustrated, so as to be used. Further, when a result estimated by the estimation unit 120 is in a predetermined state (when an abnormality degree obtained through numeric conversion performed by the numeric conversion unit 34 exceeds a predetermined threshold value, for example), the state determination device 1 may perform display output on the display device 70 with a warning message or an icon as illustrated in FIG. 7, for example, or may output a command for stopping or slowing down an operation, a command for limiting a torque of a motor, or the like, to the injection molding machine.

In the state determination device 1 having the above-described configuration, the estimation unit 120 performs estimation of a state of the injection molding machine 2 based on acquisition data acquired from the injection molding machine 2. Then, the numeric conversion unit 34 numerically converts an abnormality degree of the injection molding machine 2, which is estimated by the estimation unit 120, by using a correction function, to which correction coefficients set in a manner to be associated with a type and equipment of the injection molding machine 2 are applied, and an abnormality degree of the injection molding machine 2 is determined based on the result obtained through the conversion. Learning of learning models stored in the learning model storage unit 130 are performed based on data acquired from a reference type of injection molding machine 2 to which reference equipment is attached. However, an abnormality degree, as an estimation result obtained by the estimation unit 120, which is based on data acquired from an injection molding machine having different type and different equipment from those of the injection molding machine 2 is converted with a correction function, to which correction coefficients set in a manner to be associated with the type and equipment of the injection molding machine are applied, and whether this injection molding machine is in a normal state or an abnormal state can be determined by using a predetermined threshold value.

The embodiment according to the present invention has been described thus far. However, the present invention is not limited to the examples of the above-described embodiment and may be embodied in various aspects by appropriately adding alterations.

For example, according to the above embodiment, the state determination device 1 and the machine learning device 100 are devices having mutually different CPUs (processors), but the machine learning device 100 may be implemented by the CPU 11 included in the state determination device 1 and the system program stored in the ROM 12.

Further, when a plurality of injection molding machines 2 are connected with each other via a network, operation states of the injection molding machines 2 may be determined by one piece of state determination device 1, or the state determination devices 1 may be disposed on respective controllers included in the injection molding machines 2 and operation states of respective injection molding machines 2 may be determined by respective state determination devices 1 included in the injection molding machines 2.

The invention claimed is:

1. A state determination device for determining an operation state of an injection molding machine, the state determination device comprising:
   a processor configured to acquire data related to the injection molding machine; and
   a memory configured to store a learning model obtained by learning an operation state of a first injection molding machine with respect to data related to the first injection molding machine, and a correction coefficient which is associated with both of (1) a type of a second injection molding machine and (2) equipment attached to the second injection molding machine, wherein the processor is further configured to perform estimation of an abnormality degree using the learning model of the first injection molding machine stored in the memory, based on the acquired data which include time-series data of types of physical quantity detected in a molding operation by the injection molding machine, acquire the stored correction coefficient, and numerically convert and correct a result of estimation of the abnormality degree using the learning model of the first injection molding machine and using a predetermined correction function, to which the acquired correction coefficient associated with the second injection molding machine is applied.

2. The state determination device according to claim 1, wherein the learning model is learned with at least one learning method among supervised learning, unsupervised learning, and reinforcement learning.

3. The state determination device according to claim 1, wherein the correction function is at least one of a polynomial function and a rational function.

4. The state determination device according to claim 1, wherein the processor is further configured to acquire data related to each of a plurality of injection molding machines, which are mutually connected via a wired/wireless network, from the plurality of injection molding machines.

5. The state determination device according to claim 1, wherein the processor is further configured to acquire, as the data related to the injection molding machine, time-series data which is acquired in a predetermined time range as one time-series data based on a change of an output of signal data acquired from the injection molding machine.

6. A state determination method of determining an operation state of an injection molding machine, the state determination method comprising:

acquiring, by a processor, data related to the injection molding machine;

performing, by the processor and based on the acquired data which include time-series data of types of physical quantity detected in a molding operation by the injection molding machine, estimation of an abnormality degree using a learning model of a first injection molding machine obtained by learning an operation state of a first injection molding machine with respect to data related to the first injection molding machine; and numerically converting and correcting, by the processor, a result of the estimation of the abnormality degree, using the learning model of the first injection molding machine, and a predetermined correction function to which a correction coefficient associated with a second injection molding machine is applied, wherein the correction coefficient is associated with both of (1) a type of the second injection molding machine, and (2) equipment attached to the second injection molding machine.

7. The state determination device according to claim 1, wherein the processor is further configured to acquire data related to the injection molding machine from an external storage or a computer via wired or wireless network.

* * * * *